Aug. 19, 1924.
L. F. HARTSELL
1,505,782
TIRE DEFLATION ALARM
Filed Sept. 27, 1923
2 Sheets-Sheet 1
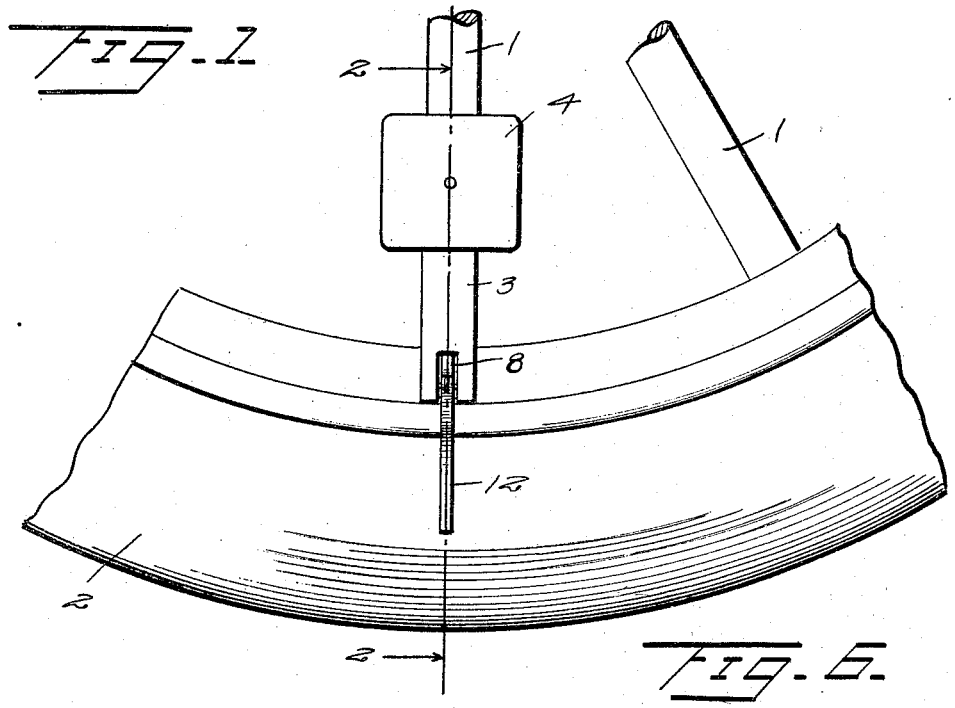
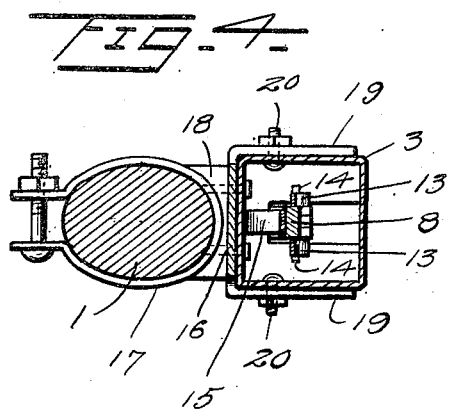
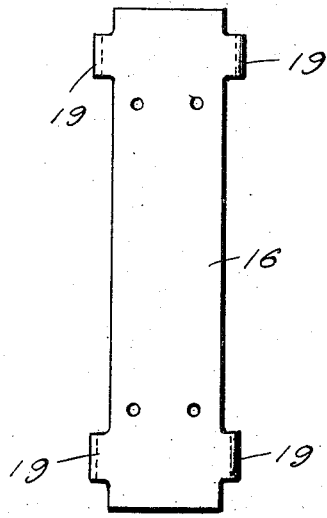
Inventor
L. F. Hartsell Aug. 19, 1924.　　　　　　　　　　　　　　1,505,782
L. F. HARTSELL
TIRE DEFLATION ALARM
Filed Sept. 27, 1923　　　　2 Sheets-Sheet 2
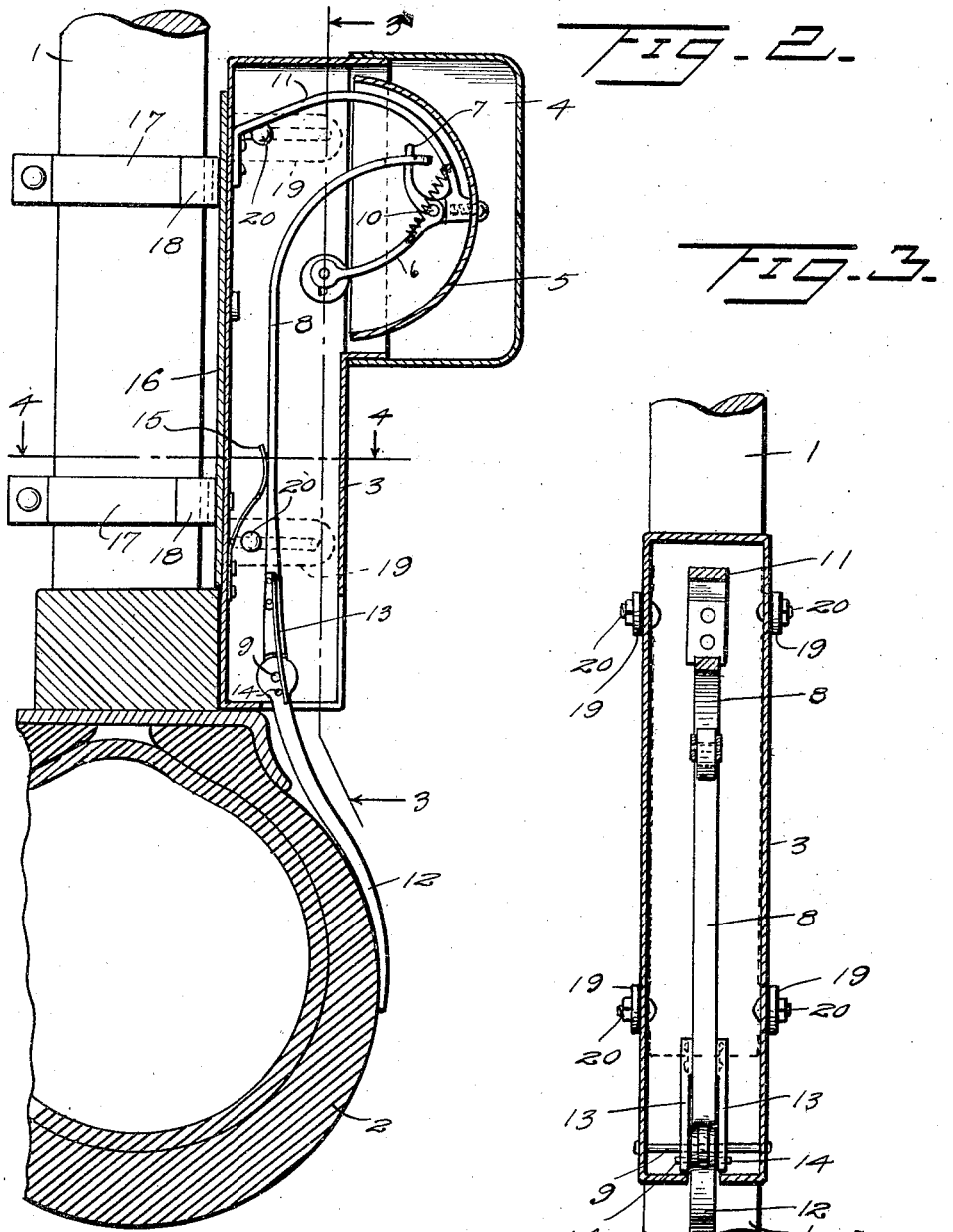
Inventor
L. F. Hartsell.

Patented Aug. 19, 1924.

1,505,782

UNITED STATES PATENT OFFICE.

LYNDON F. HARTSELL, OF CAMERON, NORTH CAROLINA.

TIRE-DEFLATION ALARM.

Application filed September 27, 1923. Serial No. 665,170.

*To all whom it may concern:*

Be it known that I, LYNDON F. HARTSELL, a citizen of the United States, residing at Cameron, in the county of Moore and State of North Carolina, have invented certain new and useful Improvements in Tire-Deflation Alarms; and I do hereby declare the following to be a full, clear, and exact description of the invention, such as will enable others skilled in the art to which it appertains to make and use the same.

The object of the present invention is to provide means whereby to give an alarm in the event of a pneumatic tire becoming soft or deflated to such an extent as to result in injury thereto if continued in service without being properly inflated.

A pneumatic tire containing little or on air bulges laterally at the load-sustaining point and resumes its normal shape when relieved of the load, and this change in outline is taken advantage of in the present instance for operating an alarm whereby to give warning of the deflation or insufficient inflation of the tire, so that steps may be taken to remedy the evil by properly inflating the tire and thereby prevent injury thereto.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of portion of a wheel having a pneumatic tire mounted thereon, showing the application of the invention, Figure 2 is a detail sectional view on the line 2—2 of Figure 1, showing the parts on a larger scale, Figure 3 is a detail sectional view on the line 3—3 of Figure 2, Figure 4 is a sectional view on the line 4—4 of Figure 2, Figure 5 is a detail view of an end portion of the lever in engagement with the arm of the bell hammer, said arm being in section, and Figure 6 is a rear view of the plate which is attached to the wheel and which receives the casing of the alarm mechanism.

Corresponding and like parts are referred to in the following description and designated in the several views of the drawings by like reference characters.

The numeral 1 designates the spokes of a wheel of the artillery type and 2 a pneumatic tire mounted upon the rim of the wheel. The numeral 3 designates the casing which encloses the operating parts of the alarm mechanism, said casing being enlarged at its upper end, as indicated at 4, to accommodate the gong bell 5 which is adapted to be sounded by a hammer 6 in a manner well understood. An arm 7 projects from the hub or pivot end of the hammer 6 and passes through a slot in the upper curved end of a lever 8 which is pivoted at its lower end to the casing, as indicated at 9. A helical spring 10 is connected at one end to a bracket 11 and at its opposite end to the hammer 6 and is normally under tension and operates to hold the hammer clear of the bell. When the hammer is moved to carry the end of the spring attached thereto beyond a straight line passing through the pivot of the hammer, it reacts to bring the hammer into contact with the bell 5 in a manner to sound the latter and give warning. An arm 12 is mounted upon the pivot 9 and its outer end curves to conform to the curvature of the tire 2 so as to lie thereagainst. A flat spring 13 is connected at one end to the lever 8 and extends across the pivot connection 9 and engages a pin 14 projecting laterally from the arm 12. When the free end of the arm 12 is moved laterally by a bulging of the tire 2 incident to little or no inflation of the tire when subjected to load pressure, the lever 8 is correspondingly moved and operates the hammer 6 and sounds an alarm, thereby giving warning that the tire is wholly or partly deflated. A flat spring 15, secured at one end to the casing 3 and engaging the lever 8 at its opposite end, serves to normally hold the lever 8 in given position and to return the hammer to operative position after sounding an alarm by striking the bell 5. The spring 15 is of sufficient tension to reset the hammer 6 against the tension of the spring 10 and is of less tension than the spring 13 to admit of operation of the lever 8 when the arm 12 is moved laterally at its free end.

The casing 3 may be of any preferred construction and may be secured in any manner to the wheel according to the particular construction of the latter. As shown, an elongated plate 16 is secured to the spoke 1 by means of clamps 17, filler blocks 18 being interposed between the spoke and plate to assist materially in holding the latter in proper position. Slotted ears 19 project laterally from opposite edges of the plate 16 and embrace opposite sides of the casing 3 which is adjustably secured thereto by means of bolts 20.

When the alarm is properly positioned and the tire fully inflated, the parts assume the position substantially as indicated in Figure 2, but should the tire become deflated or soft, it will bulge laterally under stress of the load, thereby causing the free end of the arm 12 to move laterally and operate the lever 8 whereby to sound the alarm. This takes place at each revolution of the wheel, thereby giving continuous warning and affording opportunity for proper repairs to obviate injury to the tire by running thereon when wholly or partly deflated.

What is claimed is:

1. A tire alarm, comprising a bell, a hammer therefor, a lever adapted to operate the hammer, an arm pivoted to the lever and disposed at one side of the tire, and a spring extending across the joint formed between the arm and lever and secured to one of said parts and in engagement with the other part.

2. In a tire alarm, a bell, a hammer therefor, a bracket mounting the bell and to which the hammer is pivoted, a spring fastened to the bracket and hammer normally exerting a force upon the hammer to hold it clear of the bell and to bring it in contact with the bell when moved from a given position to a point beyond the pivot of the hammer, said hammer having an arm, a lever engaging said arm, a tire-operable arm, said lever and last mentioned arm having a common axis, a spring extending across the joint formed between the lever and last mentioned arm and secured to one of said parts and being in engagement with the other of said parts, and a return spring engaging the lever.

In testimony whereof I affix my signature.

LYNDON F. HARTSELL.